T. W. CASEY.
CONTROL MECHANISM FOR CARS.
APPLICATION FILED JUNE 16, 1917.
1,293,031.
Patented Feb. 4, 1919.
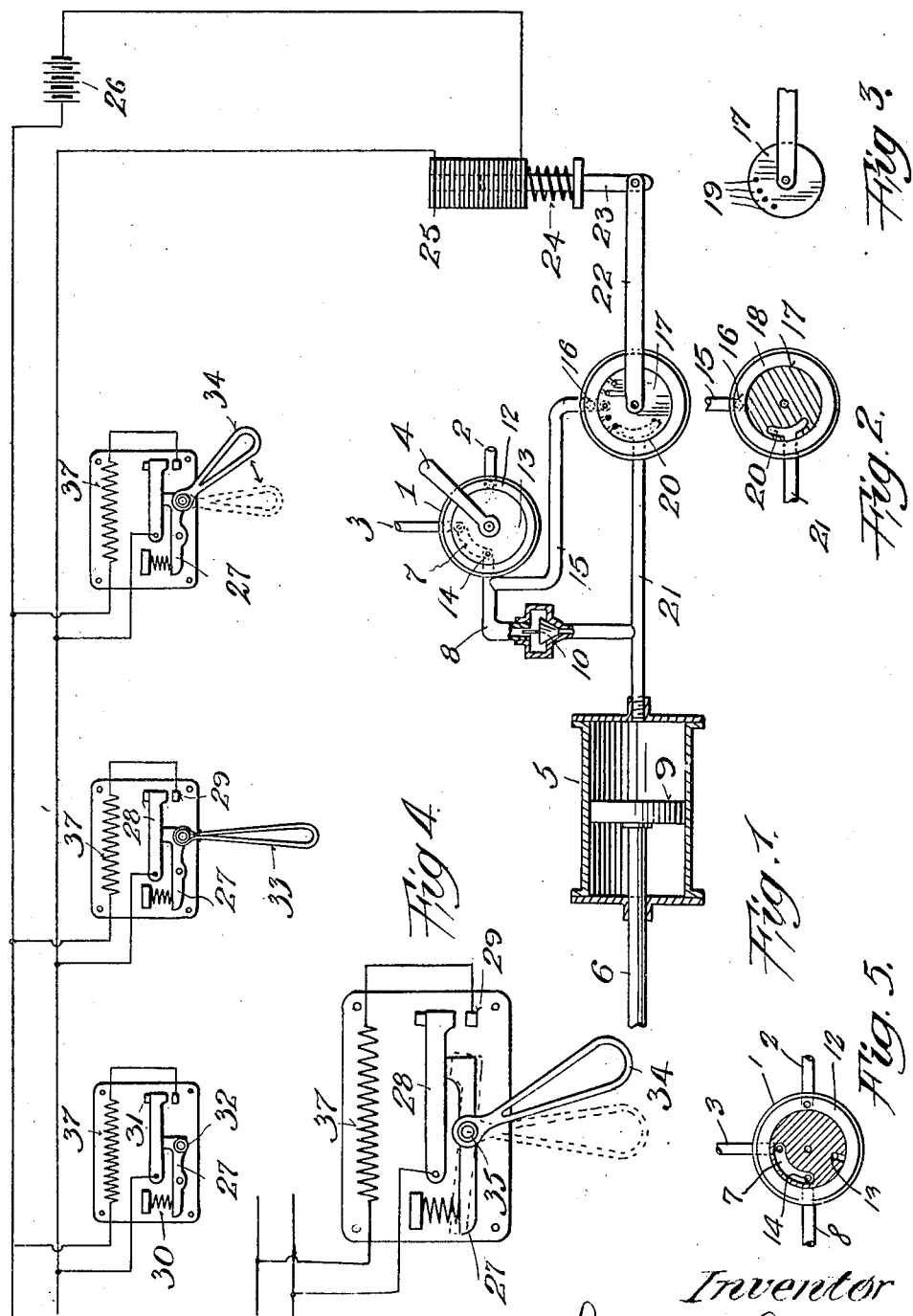

UNITED STATES PATENT OFFICE.

THOMAS W. CASEY, OF YONKERS, NEW YORK, ASSIGNOR TO NATIONAL PNEUMATIC COMPANY, OF CHICAGO, ILLINOIS, A CORPORATION OF WEST VIRGINIA.

CONTROL MECHANISM FOR CARS.

1,293,031.   Specification of Letters Patent.   Patented Feb. 4, 1919.

Application filed June 16, 1917. Serial No. 175,104.

*To all whom it may concern:*

Be it known that I, THOMAS W. CASEY, a citizen of the United States, residing at Yonkers, in the county of Westchester, State of New York, have made a certain new and useful Invention in Control Mechanism for Cars, of which the following is a specification.

This invention relates to car operating control mechanism.

The object of the invention is to provide means to utilize the number of standing passengers in a vehicle to control the performance of useful work.

A further object of the invention is to provide means for controlling the braking power of the vehicle brake by the number of standing passengers in the vehicle.

Further objects of the invention will appear more fully hereinafter.

The invention consists substantially in the construction, combination, location and relative arrangement of parts, all as will be more fully hereinafter set forth as shown by the accompanying drawing, and finally pointed out in the appended claims.

Referring to the drawing:

Figure 1 is a diagrammatic view showing one means for accomplishing the objects of my invention where the device to be controlled is pneumatically operated.

Figs. 2 and 3 are detail views showing one arrangement contemplated by my invention for controlling the pneumatic valve.

Fig. 4 shows one structure of hand-grab which may be employed in accordance with my invention to produce the results sought.

Fig. 5 is a view similar to Fig. 2 showing a detail of construction of the valve member 1.

The same part is designated by the same reference numeral wherever it occurs throughout the several views.

When street or passenger carrying vehicles become full to the sitting capacity thereof, it is the universal custom to provide hand straps or posts or grab-rails carried by the car to enable the passengers to hold on to the same for their convenience and comfort. There is, as a matter of course a pull exerted upon the strap, post or grab-rail by the standing passenger due to the swaying movement of the vehicle.

It is among the special purposes of my present invention to utilize this pull or tendency to movement for the control of useful work. The useful work which may be controlled by this pull or movement may be any desired work, and while I have shown and will now describe one specific application thereof, I wish it to be understood that my invention in its broad scope, as defined in the claims, is not to be limited thereto, as many other applications will readily occur to those skilled in the art.

It is customary in all public vehicles such as street cars, interurban cars and elevated or subway cars to provide hand straps, or posts, or grab-rails, for the convenience of passengers who have to stand. I propose to so build and arrange these hand straps, posts, handles or rails that they are relatively movable with respect to the car so that they are unconsciously moved by the passenger who is holding on to them and so that they automatically regain their normal position when liberated by the passenger. I will hereafter allude to these relatively movable straps, posts, handles or rails as hand grabs. It is manifest that they may be made in any desirable form. The specific form employed, however, forms no part of my present invention. I have illustrated certain forms of hand-grabs to which my invention is not to be limited or restricted.

It may be taken as axiomatic that the average passenger in a vehicle would rather sit than stand, and therefore that there will be no standing passengers so long as there are available seats. When all the seats are occupied and additional passengers are compelled to stand, most of those so standing find it convenient to hold to a strap or post or grab-rail. If, therefore, a certain limited motion is allowed to the straps, posts, or grab-rails so that the person holding on to them unconsciously moves them, this slight motion can be utilized as a distinguishing line between the condition where the car is lightly loaded with passengers and where it begins to be moved heavily loaded. Furthermore, speaking in a very general way, the number of straps, posts, or grab-rails that are held by standing passengers will be in rough proportion to the number of standing passengers and therefore, the motion of a considerable number of such straps, posts, or grab-rails will indicate that the car is still more heavily loaded. My invention consists broadly in the utilization of the means for indicating the amount of load in the car and of using this indicating for any purpose for the control of useful work.

For the purpose of illustrating my invention, I will describe the same as applied to controlling the brake of the vehicle whereby the braking power is increased by the number of passengers employing the hand strap, etc., and I show this application of my invention to a pneumatically operated brake. I utilize the pull exerted on the hand strap, etc., for shifting a valve controlling the supply of fluid pressure to the brake, to thereby allow greater or less fluid pressure to flow to the brake according to the number of passengers employing hand straps, etc.

In ordinary practice in applying the brakes on a moving vehicle the motorman has become accustomed to going through certain manipulations of his brake control in order to slow down the vehicle and bring it to rest within a certain traveled distance and if the load in the car did not vary appreciably then the same manipulation of the brake control would produce approximately the same result in every case, but with a largely varying load the brake control manipulation that would effect a stoppage of the car within a certain traveled distance with a light load would be altogether inadequate to stop the car within the same distance when heavily loaded, and a disastrous collision might result. It is also obvious that if so manipulated to adequately stop a heavily loaded car, it would stop a lightly loaded car so suddenly that unpleasant consequences to the passengers might ensue.

My invention furnishes a very simple inexpensive means of so controlling the amount of braking power applied that with the same manipulation of the brake control the braking power will be proportioned to its requirements as measured by the number of passengers carried on the car.

Referring to Fig. 1 of the drawing, I show a valve indicated at 1 with the fluid pressure supply connection 2 and exhaust connection 3 both leading thereto with the manual control handle 4 for the valve as is common in the art. The fluid pressure cylinder 5 controls the brake piston 6 as is well known. The valve is provided with a passage 7 normally establishing communication between the exhaust passage 3 and the pipe line 8 which leads to the cylinder 5 behind the piston 9. The pipe line 8 is controlled by the flowing valve 10 which allows the fluid pressure to escape from the cylinder 5 to exhaust 3 but prevents fluid pressure from passing in the opposite direction. It will be seen that fluid pressure is admitted to the valve 1 from pipe 2 to the passage 12 therein and from the passage 12 to port 13. When the valve is turned so that port 13 registers with port 14, fluid pressure flows through pipe connection 15 to port 16 of auxiliary valve 17 allowing the fluid pressure to flow in passage 18. The valve 17 is provided with a plurality of ports 19 all communicating with the passage 18. When the valve 17 is in its extreme closed position at least one of the ports 19 is in communication with the port 20 of pipe line 21 leading to the cylinder 5 and as the valve 17 is turned more of said ports 19 come in communication with the port 20, thus allowing more fluid pressure to flow to the cylinder 5. For controlling the movement of the valve 17, I provide an arm 22 secured to the valve stem so that upon the rotation thereof, the valve 17 will rotate therewith. The arm 22 is pivotally secured to the core 23 which acts against the action of a spring 24 when solenoid 25 is energized. Located in the circuit of the solenoid 25 is a source of current 26 and the various handgrabs of the vehicle. Any type or form of hand-grab may be employed and each of them is so constructed that when pressure is supplied thereto their respective circuits are closed and current flows through the solenoid 25. Any desired means may be employed for accomplishing this, but I show one means wherein a pivoted lever 27, maintains normally the terminals 28, 29 of the solenoid circuit in open position by means of a spring 30. A limiting stop 31 may be employed for limiting the opening movement of the switch arm 28. In one instance, I show a hand-rail 32, another instance an ordinary hand-strap 33. In another instance, an ordinary swinging strap 34. If desired the hand strap 34 may be pivotally mounted upon the pivot 35 of the lever 27 so that pivotal movement of the hand strap 34 will rock the lever 27 allowing circuit between the terminals 28, 29 to be completed. If desired a resistance 37 may be included in each of the circuits. It is obvious that the more hand straps that are in use, the greater the amount of current supplied with the solenoid 25 and consequently the greater movement imparted thereby to the valve 17 and therefore the freer passage through the supply pipe to the brake is effected. Thus, with a certain manipulation of the brake control by the motorman, that is, to establish communication between the port 13 and the port 14, the amount of pressure admitted to the brake cylinder in any given length of time would be controlled by the number of hand-straps in use by merely controlling as above described, the number of the ports 19 in communication with the elongated port 20 of the valve 17.

While I have shown and described the specific application of my invention to a brake and have described in detail in connection therewith, particular apparatus, it is to be understood that my invention is not to be limited to these details. Therefore, what I claim as new and useful and of my own invention and desire to secure by Letters Patent is:

1. In a vehicle, the combination with a device to be operated, of hand grab means controlled by the hand-grabs in proportion to the number thereof in use, for controlling the device to be operated.

2. In a vehicle, the combination with a device to be operated, of hand grab means controlled by the hand-grabs in proportion to the number thereof in use, for controlling the amount of power transmitted to the device to be operated.

3. In a vehicle, the combination with a power operated device, of hand grab means for supplying power to said device, and means operated by the movement of the hand-grabs of said vehicle for controlling the amount of power supplied by said first mentioned means to the power operated device.

4. In a vehicle, the combination with a power operated device, of hand grab means for supplying power to said device, means for normally limiting the amount of power supplied to said device, and means operated by the movement of the hand-grabs of said vehicle, for increasing the amount of power supplied by said first mentioned means to the power operated device.

5. In a vehicle, the combination with a power operated device, of hand grab means for supplying power to said device, means for normally limiting the amount of power supplied to said device, and means operated by the movement of the hand-grabs of said vehicle, for increasing the amount of power supplied by said first mentioned means to the power operated device in proportion to the number of hand-grabs in use.

6. In a vehicle, the combination with power operated brakes, of hand grab means operated by the movement of the hand-grabs of said vehicle for controlling the amount of power supplied to said brakes.

7. In a vehicle, the combination with power operated brakes, of hand grab means operated by the movement of the hand-grabs of said vehicle for increasing the amount of power supplied to said brakes.

8. In a vehicle, the combination with power operated brakes, of hand grab means operated by the movement of the hand-grabs of said vehicle for increasing the amount of power supplied to said brakes, in proportion to the number of said hand-grabs in use.

9. In a vehicle, the combination with a pneumatically operated brake, of hand grab means controlled by the hand-grabs of the vehicle for controlling the fluid pressure admitted to the brake.

10. In a vehicle, the combination with a pneumatically operated brake, of hand grab means controlled by the handgrabs of the vehicle for controlling the amount of fluid pressure admitted to the brake in proportion to the number of hand-grabs in use.

11. In a vehicle, the combination with a pneumatically operated brake, of hand grab means for normally allowing a limited amount of fluid pressure to be supplied to said brake, and means operated by the movement of the handgrabs of the vehicle for increasing the amount of fluid pressure supplied to the brake.

12. In a vehicle, the combination with a pneumatically operated brake, of hand grab means for normally allowing a limited amount of fluid pressure to be supplied to said brake, and means operated by the movement of the hand-grabs of the vehicle for increasing the amount of fluid pressure supplied to the brake, in proportion to the number of said hand-grabs in use.

13. In a vehicle, the combination with a pneumatically operated brake, of electrically operated means controlled by the hand-grabs of the vehicle for controlling the fluid pressure admitted to the brake.

14. In a vehicle, the combination with a pneumatically operated brake, of hand grab electrically operated means controlled by the hand-grabs of the vehicle for controlling the amount of fluid pressure admitted to the brake.

15. In a vehicle, the combination with a pneumatically operated brake, of hand grab means for normally allowing a limited amount of fluid pressure to be supplied to said brake, and electrically operated means controlled by the hand-grabs of the vehicle for increasing the amount of fluid pressure supplied to the brake.

16. In a vehicle, the combination with a pneumatically operated brake, of hand grab means for normally allowing a limited amount of fluid pressure to be supplied to said brake, and electrically operated means controlled by the hand-grabs of the vehicle for increasing the amount of fluid pressure supplied to the brake in proportion to the number of said handstraps in use.

In testimony whereof I have hereunto set my hand on this 13th day of June A. D., 1917.

THOMAS W. CASEY.